AUTOMATIC CHARACTER RECOGNITION METHOD

Filed Oct. 17, 1958 2 Sheets-Sheet 1

INVENTOR.
K. STEINBUCH
BY [signature]
ATTORNEY

AUTOMATIC CHARACTER RECOGNITION METHOD

Filed Oct. 17, 1958 2 Sheets-Sheet 2

INVENTOR.
K. STEINBUCH
BY Robert Harding Jr.
ATTORNEY

United States Patent Office 3,066,224

Patented Nov. 27, 1962

3,066,224

AUTOMATIC CHARACTER RECOGNITION METHOD

Karl Steinbuch, Reichenbach, near Karlsruhe, Germany, assignor to International Standard Electric Corporation, New York, N.Y., a corporation of Delaware Filed Oct. 17, 1958, Ser. No. 767,895
Claims priority, application Germany Oct. 26, 1957
6 Claims. (Cl. 250—219)

Figure 1:
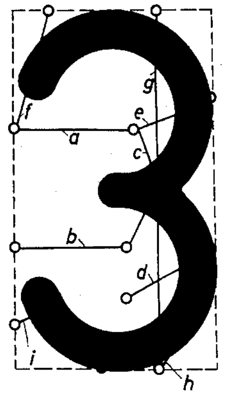

This invention relates to a method of automatically recognizing characters.

In some of the conventional methods the characters are photoelectrically scanned along certain horizontal and/or vertical lines for thus determining the respective black/white transitions. When suitably selecting the scanning lines, characteristics or criterions for the individual characters will result, representing a definite code relative to the respective characters. However, this coding is completely arbitrary and, therefore, as a rule also not very understandable. It is particularly disadvantageous that the black/white transitions occur of necessity at exactly defined points within the scanning field. For this reason any more or less great deviation may be the cause of a faulty recognition. Such deviations are very likely to happen especially in the case of typewritten characters, because the typewriter types are often soiled. An unambiguous recognition is therefore not reliably ensured in all cases.

Various other scanning methods have already been proposed for avoiding these disadvantages. By one of these conventional proposals it is suggested to use the delineation or lines of the characters as a distinguishing criterion. In such methods, however, a faulty interruption in the lines of the characters may sometimes have a very disturbing effect.

In order to avoid faulty evaluations very complicated methods are therefore required in most cases for determining whether the interruption of the lines is not due to the character itself.

Furthermore it has already been proposed to image or represent the characters on a plate of insulating material which is coated with light-sensitive resistors and to perform a checking of the respective conductance and resistance values of these resistors. For enabling an unambiguous recognition these so-called light probes are accommodated in a suitable shape and arrangement within the field of reproduction. In this way some of the light probes will always be covered or cut through by the trace or delineations (lines) of the character, while others will remain completely uncovered by the character. The position of the light probes is so chosen that for a given type of characters, a combination of light probes, either cut through or not cut through by the lines of the character, is characteristic of a predetermined character, thus enabling the recognition thereof.

An arrangement of this kind which, on principle, is very advantageous, bears the inconvenience, however, that the manufacture of the light probes is rather difficult.

The invention is based on the idea that the principal feature of recognizing characters with the aid of light probes can be modified in an advantageous manner when the light probes are regarded only as imaginary tracks or traces on the paper with the character to be read, and when a light spot is guided along these tracks for effecting the scanning. Accordingly, the invention consists in conducting a scanning light spot along characteristic scanning tracks or traces, which are adapted in such a way to the characters with respect to number, position and shape, within the scanning field, that, with respect to every character, a characterizing combination of the scanning tracks which are covered or noncovered by the lines of the characters will result, and will produce on every scanning track one output signal independently of the position of the character on the scanning track, in that the light-remission ability is ascertained at the respective scanning point.

If the light probe, that is, the scanning track, lies completely within the area of the paper surface which is not covered by characters, then the remission ability along this track remains unchanged and the photoelectric transducer will conduct its full current during the time in which this track is being scanned. However, if the light spot on its way along the scanning track crosses a line of a character, in other words, if this track is interrupted or cut through by the character, the electric transducer, due to the low remission ability which is caused by the printing colour, will transmit a low-current impulse at this point. Accordingly, scanning tracks which are either cut through or not cut through, i.e. interrupted or non-interrupted by the character, may be distinguished by checking whether, during the passage time of the light spot, the photoelectric transducer transmits a dark-current pulse or not.

For producing the light spot, it is appropriate to use a cathode-ray tube whose screen is imaged at a reduced scale on the paper surface together with the character. Voltages varying with respect to time are applied to the pairs of deflection plates, so that the produced light spot will pass through the desired scanning tracks.

Secondary electron multipliers which are highly sensitive and suitable for measuring a momentarily appearing light current may be used as photoelectric transducers.

Figure 2:
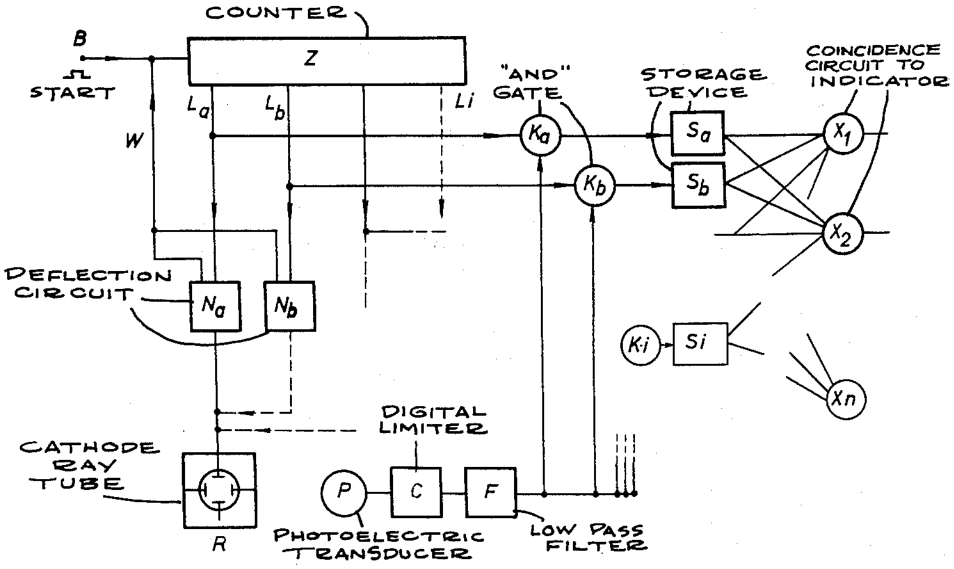
Figure 3A:
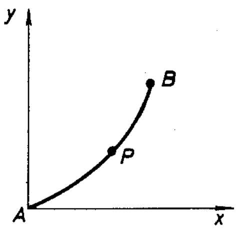
Figure 3B:
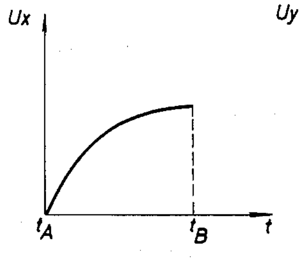
Figure 3C:
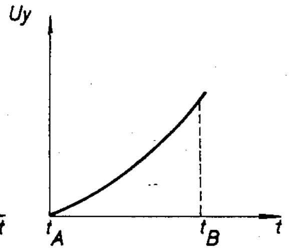
Figure 4A:
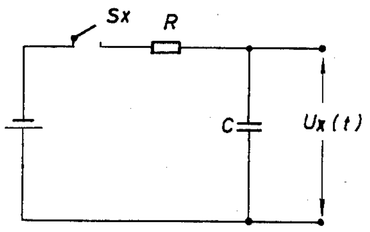
Figure 4B:
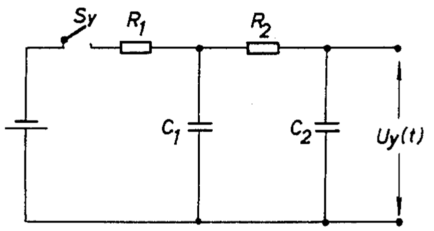

In the following the invention will now be described with reference to FIGS. 1–4 of the copending drawings, in which:

FIG. 1 shows the number 3 within a scanning field provided with scanning tracks according to the invention, FIG. 2 shows a block diagram relating to a circuit arrangement for performing the scanning along these tracks, FIG. 3*a* shows part of a scanning track, FIGS. 3*b* and 3*c* show the necessary voltages which are varied with respect to time to produce the track, and FIGS. 4*a* and 4*b* show the networks for producing these scanning tracks within a cathode-ray tube.

Referring to FIG. 1 there is shown by way of example a scanning field including the scanning traces *a* through *i*. At first the selection of the scanning traces is performed at will and is merely supposed to serve the better understanding of the invention. In the individual cases the scanning traces will have to be adapted to the existing operating conditions.

For the purpose of recognizing the character the respective character is at first centered and aligned in the character field with the aid of conventional means. The scanning over the various tracks is then controlled by means of a counter Z having a stage for each track the output lines of which are indicated at L*a*, L*b* . . . L*i* in FIG. 2. The stages are normally in the digital position "0" and are caused to assume the position "1" in sequence as the counter is stepped. The output lines are connected respectively to networks N*a*, N*b*, etc., which have not been shown in detail but consist of oscillators and associated circuitry, well known in the art, for causing the beam of the cathode ray tube R to follow the particular track. By means of a start pulse transmitted over the line B (FIG. 2) to the counter Z, the output line L*a* is brought into the digital position "1," while all of the remaining output lines are still in position "0."

At the time position of marking the line L*a*, the associating network N*a* is caused to oscillate for delivering the voltages at its output lines which are varied with respect to time and necessary for causing the light spot to pass along the first scanning track *a*. These voltages are required by the deflection plates of the cathode-ray tube R.

The electric signals which are produced by reflection from the scanning field during the scanning operation by the light spot are amplified by the photoelectric transducer P, which is followed in the arrangement by a digital limiter C which may be an ordinary monostable flip-flop circuit and whose position "0" corresponds to the normal intensity current. Upon appearance of a dark-current pulse it will change over to its position "1" for the time duration of the impulse. The output of said limiter C is connected with the low-pass filter F which prohibits the passage of very short pulses, which, e.g., may be caused by paper contaminations or impurities. If, during the scanning operation, a dark-current pulse appears, then the output pulse of the limiter will be applied via the filter to the AND-gates K*a* . . . K*i*. The second input line of each of these gates is connected with its associated output line L*a* . . . L*i* of the counter Z, and the output of each gate is connected to an associated storage device (S*a*, S*b* . . . ) which may be a flip-flop circuit. After the line L*a* has been marked, the output pulse of the limiter C may be applied via the gate K*a* to the storage device S*a* which is thereupon brought into its digital position "1." In cases where no dark-current pulse appears during the scanning operation this storage device will remain in position "0."

After the scanning track "*a*" has been traced, a transfer pulse will be transmitted by the network N*a* to the counter Z via the line W. On account of this the output line L*b* thereof will assume its position "1" and, simultaneously, will trigger the next successive network N*b* which is competent for effecting the tracing of the scanning track *b*. These processes will be repeated until all of the tracks have been traced by the light spot, whereupon the scanning of one character is completed. The outputs of the networks are decoupled with respect to one another in a manner not shown in order to avoid faulty indications.

The storage devices S*a* . . . S*i* indicate by their positions "0" or "1" the result of the light scanning. A combination of their statements for the character recognition purpose is effected via the coincidence circuits $X_1$, $X_2$ . . . $X_n$, the number of which corresponds to the number of possible characters. The coincidence circuits are so constructed and connected with the storage devices that only one of them having a predetermined combination of storage settings from the storage devices S*a*, S*b*, etc., which is characteristic of the character, can be marked, thus effecting an unambiguous indication of the character recognized in this way.

The networks N*a* . . . N*i* may also be replaced by e.g. one single network or by only a few networks. When employing one single network, the deflecting voltages have to be suppressed during the periods in which the light spot is not being conducted on a scanning track, e.g. when changing over from one track to the next one, in other words, a suppression of the electron beam will have to be effected. During this beam suppression, all of the output lines of the counter are in position "0," so that the inputs of the storage devices are blocked and, consequently, no indication can take place. At the end of the beam suppression, the next successive output line of the counter will be marked.

The details of the circuits shown schematically in FIG. 2 are well known to those skilled in the art. For example, AND gates are fully illustrated and described in Fig. 9.10 and on page 85 of "Automatic Digital Calculators," Booth and Booth, published in 1956 by the Academic Press, Inc. Storage devices suitable for use in the present arrangement are merely flip-flop circuits, and these have been illustrated fully in Fig. 10.3 on page 96 of the same publication. The digital limiter C being a monostable flip-flop circuit, those skilled in the art will readily appreciate that such circuits are well known as shown for example on pages 174–175 of the book entitled "Pulse and Digital Circuits," by Millman and Taub, published in 1956 by McGraw-Hill Book Co., Inc. Finally a counter suitable for use as the counter Z is described in the first mentioned publication and an example thereof is illustrated on page 99, Fig. 10.6 of that publication.

In FIGS. 4*a* and 4*b*, by way of example, a network is shown which can be used for producing the scanning track shown in FIG. 3*a*. In order to let the spot P travel or describe this track at an almost constant track speed, voltages $U_x(t)$ and $U_y(t)$, variable with respect to time, would have to be applied to the pairs of deflection plates corresponding respectively to the X- or Y-direction, the curve relating to the quality of these voltages being plotted in FIGS. 3*b* and 3*c*. The generation of these voltages can be carried out e.g. with the circuits as shown in FIGS. 4*a* and 4*b*, both of which together form the network N*a*. At the beginning of the scanning operation both the switches $S_x$ and $S_y$ will be closed. Time constant RC of the circuit shown in FIG. 4*a* is somewhat smaller than the time $t_B-t_A$ which is required for tracing the scanning track, so that the voltage curve as shown in FIG. 3*b* will result. Unlike in the case of FIG. 4*a*, in the circuit arrangement according to FIG. 4*b* the time constant $R_1C_1 \gg t_B-t_A$, whereby at $C_1$ a voltage rise will appear which is linear with respect to time and which, at the output of the connected RC-circuit, whose time constant $R_2C_2$ is in the order of $t_B-t_A$, produces the voltage corresponding to the showing of FIG. 3*c*.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. The method of automatically recognizing a character positioned in a field of view which comprises successively scanning said field with a spot of light in a plurality of predetermined tracks having different directions and different positions in said field, intercepting light from said field as said spot of light moves along each track, using said intercepted light during the scanning of said spot along each track to indicate whether or not said spot has crossed a line of said character, and indicating the character in terms of the combination of tracks along which a line of the character has been crossed and the combination of tracks along which a line of the character has not been crossed.

2. The method of automatically recognizing a character positioned in a field of view, as defined in claim 1, in which the step of successively scanning said field with a spot of light comprises producing a beam of electrons, directing said beam against a fluorescent screen to form a spot of light, altering the direction of said beam in a predetermined manner to produce movement of said spot successively along the tracks, and imaging said screen on said field of view.

3. Apparatus for automatically recognizing a character positioned in a field of view which comprises means creating a spot of light on said field of view, means for causing said spot to move successively along a plurality of tracks having predetermined positions on said field and predetermined different directions, means for intercepting light from said field as said spot of light moves along said tracks, a separate storage device for each track, means controlled by said intercepting means for operating a storage device when the spot of light crosses a line of the character while moving along the associated track, a plurality of indicating devices, one representing each character to be recognized, and cross connecting means for connecting combinations of said storage device to each indicating device to operate said device when the character represented thereby has been scanned by said light spot.

4. Apparatus, as defined in claim 3, in which the means for causing the spot of light to move successively along a plurality of tracks comprises a plurality of light-spot deflecting circuits each adapted to move said spot along a different one of the tracks on the field of view, a counter having a position for each deflecting circuit, each deflecting circuit adapted to operate when the counter is on the position corresponding thereto, and means in each deflecting circuit for stepping said counter when the spot of light has completed its movement along the track corresponding to said deflecting circuit.

5. Apparatus, as defined in claim 4, in which the means for operating a storage device comprises a photoelectric transducer positioned so as to intercept light from the field of view, a digital limiter responsive to the output of said transducer for producing a predetermined voltage when said transducer responds to a cessation of light as said spot crosses a line of the character, an "and" gate, means for opening said gate when said digital limiter produces said predetermined voltage and said counter is simultaneously on the position corresponding to the track being scanned by said spot of light, and means for operating said storage device when said gate is open.

6. Apparatus, as defined in claim 4, in which the means for causing the spot of light to move successively along a plurality of tracks further comprises a cathode ray tube, the light-spot deflecting circuits being deflecting circuits for the beam of said tube, and means for imaging the face of said tube on the field of view.

References Cited in the file of this patent

UNITED STATES PATENTS

| | | |
|---|---|---|
| 2,523,328 | Ranks | Sept. 26, 1950 |
| 2,616,983 | Zworykin | Nov. 4, 1952 |
| 2,656,101 | Haviland | Oct. 20, 1953 |
| 2,927,216 | Lohninger | Mar. 1, 1960 |